United States Patent
Pfeiffer et al.

[15] 3,671,557
[45] June 20, 1972

[54] 1,2-DIACYLGLYCEROL 3-(2,2,2-TRICHLOROETHYL) CARBONATES

[72] Inventors: Francis R. Pfeiffer, Cinnaminson; Jerry A. Weisbach, Cherry Hill, both of N.J.

[73] Assignee: Smith, Kline & French Laboratories, Philadelphia, Pa.

[22] Filed: Sept. 17, 1970

[21] Appl. No.: 73,224

Related U.S. Application Data

[63] Continuation-in-part of Ser. No. 722,538, April 19, 1968, Pat. No. 3,558,656.

[52] U.S. Cl..........................260/408, 260/340.2, 260/340.9, 260/410.7, 260/463, 260/611 A
[51] Int. Cl. ................C07c 69/30, C07c 69/00, C07d 13/04
[58] Field of Search..........................260/408, 463, 410.7 US

[56] References Cited

UNITED STATES PATENTS 2,266,591    12/1941    Eckey et al. ..............................99/163

OTHER PUBLICATIONS

Rakhit et al.; Canadian J. Chemistry, Vol. 47, No. 15, pp. 2906– 2910, 8/1/69

*Primary Examiner*—Lewis Gotts
*Assistant Examiner*—Diana G. Rivers
*Attorney*—William H. Edgerton, Richard D. Foggio, Joan S. Keps, Alan D. Lourie and Joseph A. Marlino

[57] ABSTRACT

1,2 and 2,3-Diacylglycerols are prepared from sn-glycerol 1,2-acetonide via the intermediate sn-glycerol 1,2-acetonide 3-(2,2,2-trichloroethyl) carbonate, which, after hydolysis with acid to the 1,2-diol derivative rearranges stereospecifically in pyridine or thermally to give sn-glycerol 2,3-carbonate.

4 Claims, No Drawings

1,2-DIACYLGLYCEROL 3-(2,2,2-TRICHLOROETHYL) CARBONATES

This application is a continuation-in-part of copending application Ser. No. 722,538, filed Apr. 19, 1968 now U.S. Pat. No. 3,558,656.

This invention relates to new chemical compounds and to a process for preparing said compounds. In particular, the invention relates to glycerol esters and to processes therefor.

The first and principal product aspect of the invention consists of the novel and useful compound sn-glycerol 1,2-acetonide 3-(2,2,2-trichloroethyl) carbonate (II).

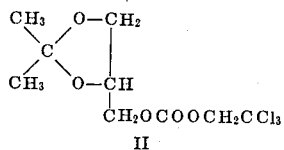

II

A second product aspect of the invention consists of the novel and useful compound sn-glycerol 3-(2,2,2-trichloroethyl) carbonate (III).

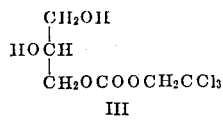

III

A third product aspect of the invention consists of the novel and useful compound sn-glycerol 1,2-carbonate-3-(2,2,2-trichloroethyl) carbonate (V).

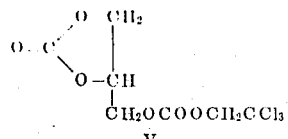

V

A fourth product aspect of the invention comprises the novel and useful sn-1,2,-diacylglycerol 3-(2,2,2-trichloroethyl) carbonate compounds X. These compounds constitute a most important aspect of the invention, as they permit the first facile preparation of polyunsaturated 1,2-diglycerides.

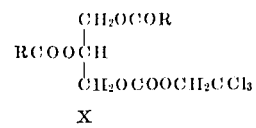

X

In the formula X, R may be a saturated or unsaturated aliphatic group of 9 to 19 carbon atoms. Among the groups which are therefore encompassed by the RCO designation are capryl, lauroyl, myristoyl, palmitoyl, stearoyl, arachidoyl, $\Delta^{9(10)}$—decylenoyl, $\Delta^{9(10)}$—dodecylenoyl, palmitoleoyl, oleoyl, elaidoyl, ricinoleoyl, petroselinoyl, vaccenoyl, linoleoyl, linolenoyl, and arachidonyl. It is preferred that both acyl groups be the same, although selective acylation by known methods permits the preparation of compounds having different acyl groups.

The process aspect of the invention consists of a method for preparing sn-glycerol 2,3-carbonate (IV) through hydrolysis of sn-glycerol 1,2-acetonide-3-(2,2,2-trichloroethyl)

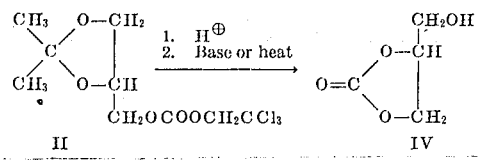

carbonate (II) with a weak acid and rearrangement to IV by means of thermal or base catalysis. The preferred hydrolytic system consists of boric acid and trimethyl borate. Temperatures from approximately 25° to the reflux temperature of the solvent may be used, the length of time required being approximately inversely proportional to the temperature. Temperatures of 80°–100° for about 2 hours are preferred in the boric acid-trimethyl borate system to effect the rearrangement. Generally, temperatures of about 65°–150° are effective to cause the rearrangement. A base such as pyridine may also be used.

Another useful system consists of first hydrolyzing II with dilute hydrochloric acid in a solvent such as methanol-ether at room temperature and then cyclizing to IV with a base such as pyridine or by heating (65°–150°). Temperatures of about 0°–35 may be employed in the hydrolysis, room temperature being preferred.

The invention in all its aspects is made clear by reference to the chart below.

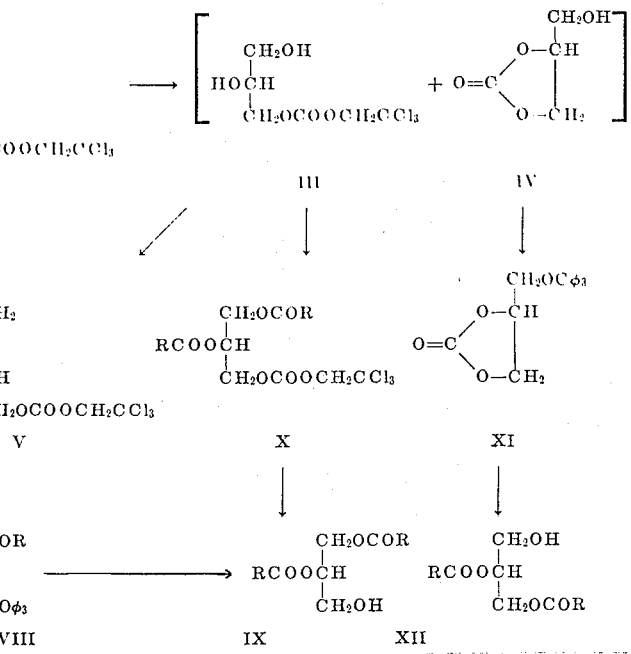

Compound II is prepared by treatment of sn-glycerol 1,2-acetonide (I) with 2,2,2-trichloroethyl chloroformate in the presence of an acid acceptor such as pyridine. This novel intermediate is converted to sn-glycerol 2,3-carbonate (IV) by means of a weak acid, e.g., $H_3BO_3$, followed by heating at 65°–150°. The rearrangement is stereospecific and results in the elimination of trichloroethanol and acetone. sn-Glycerol 3-(2,2,2-trichloroethyl) carbonate (III) is also obtained in the reaction, this product being the expected hydrolysis product of II. Vacuum distillation of III also produces IV, with the elimination of trichloroethanol. When the reaction mixture containing III and IV is treated with triphenylmethyl chloride in the presence of an acid acceptor such as pyridine, the known sn-glycerol 2,3-carbonate 1-triphenylmethyl ether (XI) is obtained. This compound is then converted by known methods to 2,3-diacyl-sn-glyercols, including the 2,3-distearate, 2,3-dioleate, 2,3-dilinoleate, and 2,3-dielaidate, which are preferred. These products are optically active and can alternatively be designated as L-2,3-diacylglycerols or D-1,2-diacylglycerols.

Compound XI is converted to the diacylglycerols by hydrolysis of the carbonate group with alkali, acylation with two equivalents of an acyl halide such as stearoyl chloride, and removal of the triphenylmethyl ether grouping with boric acid and trimethyl borate. The rearrangement of compound II to give compound IV thus enables one to readily prepare the 2,3-diacyl-sn-glycerols XII in six steps.

The present invention also provides a means for preparing the enantiomeric 1,2-diacyl-sn-glyercols IX, alternately designated as D-2,3-diacylglycerols or L-1,2-diacylglycerols. Compound II is hydrolyzed in strong acid, preferably in 1N hydrochloric acid and the resulting sn-glycerol 3-(2,2,2-trichloroethyl carbonate) III is then acylated with an acid halide such as stearoyl chloride to give the sn-glycerol 1,2-distearate 3-(2,2,2-trichloroethyl) carbonate X. Removal of the trichloroethyl carbonate group with zinc and acetic acid gives the diacylglycerol IX.

An alternative method of obtaining these sn-1,2-diacylglycerols (IX) involves the reaction of compound III with phosgene to give sn-glycerol 1,2-carbonate 3-(2,2,2-trichloroethyl) carbonate (V). Removal of the trichloroethyl carbonate group with zinc and acetic acid gives the sn-1,2-carbonate VI. Formation of the 3-triphenylmethyl ether and hydrolysis of the carbonate with alkali gives compound VII. Diacylation as previously described gives VIII and removal of the triphenylmethyl group give the products IX.

The present process thus provides a method for obtaining both of the optically active 1,2-diacylglycerols by means of a limited number of reactions starting with the novel common intermediate II. The advantages of the process are readily apparent from the recognition that the intermediate sn-glycerol 1-triphenylmethyl ether 2,3-carbonate (XI) was previously obtainable only from D-mannitol in a 12-step sequence and the intermediate sn-glycerol 1,2-carbonate 3-triphenylmethyl ether was previously obtainable only from a multistep sequence using sn-glycerol-3-benzyl ether as an intermediate. The present process obviously requires many fewer steps. It is especially advantageous in preparing diacylglycerols in which the acyl groups are unsaturated, as previous methods have required cumbersome and lengthy procedures involving protective groups.

The diacylglycerols obtained by means of the present process and from the novel intermediates of this invention are known to be used as emulsifying agents, particularly in the food industry, and as coatings for pharmaceutical products. They are used in the preparation of baked goods and in superglycerinated shortenings. They are used as coating materials for various food products such as meat, fish, and cheese in order to protect them against loss of moisture and against contamination. Their manner of use is well-known to those skilled in these fields.

The diglycerides are also known to be involved in the synthesis, metabolism, and deposition of body fat. They are useful in the preparation of phosphatidic acids and phospholipids, the latter compounds being an important class of body lipids. The availability of optically active diacylglycerols provided by means of the present process is of significance in these areas.

The following examples are intended to illustrate the preparation of the compounds of the invention and the practice of the process of the invention, but are not to be construed as limiting their scope. Temperatures stated are in degrees Centigrade.

EXAMPLE 1 sn-Glycerol-1,2-acetonide 3-(2,2,2-trichloroethyl) carbonate

To an ice cold solution of 62.3 g. (0.471 mole) of sn-glycerol 1,2-acetonide in 25 ml. of dry $CHCl_3$ was added slowly 50 ml. of dry pyridine. Then a solution of 100 g. (0.471 mole) of 2,2,2-trichloroethyl chloroformate in 50 ml. of $CHCl_3$ was added dropwise at 0°. The solution was stirred overnight at room temperature, diluted with 400 ml. of ether and washed successively with dil. HCl, water, 5 percent $NaHCO_3$ and water. After drying ($Na_2SO_4$), the solvent was evaporated and the colorless syrup was distilled to afford 118.5 g. (82 percent) of the title compound, b.p. 130°/0.025 mm; $[\alpha]^{25}_D - 1.5°$ (c 0.87, $CHCl_3$); nmr ($CDCl_3$) δ4.81 (s, 2, $CH_2CCl_3$).

Anal. Calc'd for $C_9H_{13}Cl_3O_5$: C, 35.15; H, 4.26; Cl, 34.58. Found: C, 35.35; H, 4.39; Cl, 34.80.

EXAMPLE 2 sn-Glycerol 2,3-carbonate 1-triphenylmethyl ether

A solution of 4.65 g. of sn-glycerol-1,2-acetonide 3-(2,2,2-trichloroethyl) carbonate, 2.0 g. of boric acid, and 20 ml. of trimethyl borate was refluxed for 1 hr. under a nitrogen atmosphere. Then the mixture was heated on a rotary evaporator at 80° for 40 minutes, and cooled and diluted with 150 ml. of water and 300 ml. of ethyl acetate. The resulting suspension was swirled in a separatory funnel until all the solids had dissolved. The ethyl acetate layer was washed with brine, dried ($Na_2SO_4$), concentrated and azeotroped with benzene to afford a viscous syrup. Glc analysis of the product (as the trifluoroacetate derivatives) showed the material to be a mixture of 74.3 percent of sn-glycerol 3-(2,2,2-trichloroethyl) carbonate and 25.7 percent of sn-glycerol 2,3-carbonate.

The crude product was dissolved in 15 ml. of $CHCl_3$ and 10 ml. of pyridine and 4.21 g. of triphenylmethyl chloride was added; the solution was stirred at 60° for 18 hours. Ethyl acetate was added and the solution was washed with dil. HCl, water, 5 percent $NaHCO_3$ and water. The dried solution was evaporated to give a white solid which was crystallized from acetone-petroleum ether to yield 3.7 g. (68 percent) of the title compound, m.p. 215°–217°. Additional recrystallization from acetone gave the analytical specimen, m.p. 217°–219°; $[\alpha]^{25}_D + 19.1°$ (c 1.33, $CHCl_3$).

Anal. Calc'd for $C_{23}H_{20}O_4$: C, 76.65; H, 5.59. Found: C, 76.58; H, 5.66.

EXAMPLE 3 sn-Glycerol 1,2-carbonate 3-(2,2,2-trichloroethyl) carbonate

A solution of 11.1 g. of sn-glycerol-1,2-acetonide 3-(2,2,2-trichloroethyl) carbonate, 20 ml. of ether, 6 ml. of methanol, and 3 ml. of 3 N HCl was stirred at room temperature for 18 hours and then evaporated in vacuo at 30° to give an oily residue. The oil was dissolved in 300 ml. of ethyl acetate and washed with brine (6X). The dried solution was concentrated and azeotroped with benzene to give a colorless, viscous syrup which was a mixture of 93.5 percent of sn-glyercol 3-(2,2,2-trichloroethyl) carbonate and 6.5 percent of sn-glycerol 2,3-carbonate. This mixture was dissolved in 50 ml. of dry pyridine and a stream of phosgene was introduced over the top of the stirred solution (kept at 0°). After 30–40 minutes, during which time a solid precipitated, the reaction was cautiously quenched by the addition of ice, then diluted with 200 ml. of ice-water and the solid extracted into ether. The ether solution was washed with dil. HCl, water, 5 percent NaHCO$_3$ and water. Removal of the ether gave 10.4 g. of an oily white solid which was crystallized from ether to afford white, crystalline sn-glycerol 1,2-carbonate 3-(2,2,2-trichloroethyl) carbonate, m.p. 77°–79°. An analytical sample was recrystallized from isopropanol, m.p. 80°–82°; $[\alpha]^{25}_D - 10.5°$ (c 1.16, CHCl$_3$); nmr (CDCl$_3$) $\delta$4.80 (s, 2, CH$_2$CCl$_3$).

Anal. Calc'd for C$_7$H$_7$Cl$_3$O$_6$: C, 28.65; H, 2.40; Cl, 36.24.
Found: C, 29.01; H, 2.42; Cl, 36.45.

EXAMPLE 4 sn-Glycerol 1,2-distearate 3-(2,2,2-trichloroethyl)carbonate

Crude sn-glycerol 3-(2,2,2-trichloroethyl) carbonate (5.34 g.) was dissolved in 25 ml. of dry CHCl$_3$ and 4.5 ml. of pyridine. To the cooled solution was added dropwise a solution of 12 g. of stearoyl chloride in 50 ml. of CHCl$_3$. The solution was stirred for 48 hours at 25°, diluted with ether and washed with dil. HCl, water, NaHCO$_3$ and water, dried (Na$_2$SO$_4$) and concentrated to a white, oily solid. Tlc showed the product to be contaminated with some sn-glyercol 1-stearate 2,3-carbonate. This mixture was chromatographed over Florisil with ether-petroleum ether mixtures to give 9.7 g. (60 percent) of homogeneous sn-glycerol 1,2-distearate 3-(2,2,2-trichloroethyl) carbonate, m.p. 55°–56°. Recrystallization from ether-methanol gave the white, crystalline analytical sample, m.p. 56°–57°; $[\alpha]^{25}_D - 1.7°$ (c 1.05, CHCl$_3$); nmr (CDCl$_3$) $\delta$4.76 (s, 2, CH$_2$CCl$_3$).

Anal. Calc'd for C$_{42}$H$_{77}$Cl$_3$O$_7$: C, 63.02; H, 9.70; Cl, 13.29.
Found: C, 63.53; H, 9.66; Cl, 13.43.

Following the same procedure as described above, there was prepared sn-glycerol 1,2-dioleate 3-(2,2,2-trichloroethyl carbonate), $[\alpha]^{25}_D - 1.4°$ (c 0.88, CHCl$_3$); nmr (CDCl$_3$) $\delta$4.78 (s, 2, CH$_2$CCl$_3$).

Anal. Calc'd for C$_{42}$H$_{73}$Cl$_3$O$_7$: C, 63.34; H, 9.24; Cl, 13.36.
Found: C, 63.30; H, 9.21; Cl, 13.54.

Also prepared by the same procedure was sn-glycerol 1,2-dilinoleate 3-(2,2,2-trichloroethyl) carbonate; $[\alpha]^{25}_D - 3.28°$ (c 1.49, CHCl$_3$); nmr (CDCl$_3$) $\delta$4.80 (s, 2, CH$_2$CCl$_3$).

Anal. Calc'd for C$_{42}$H$_{69}$Cl$_3$O$_7$: C, 63.66; H, 8.78; Cl, 13.42.
Found: C, 63.25; H, 8.77; Cl, 13.60.

In a similar fashion there may be prepared sn-glycerol 1,2-dielaidate 3-(2,2,2-trichloroethyl)carbonate and other 1,2-diacyl-sn-glycerols.

EXAMPLE 5 sn-Glycerol 1,2-disterate

A suspension of 1.0 g. of sn-glycerol 1,2-distearate 3-(2,2,2-trichloroethyl) carbonate, 1.0 g. of activated zinc, 15 ml. of glacial acetic acid and 15 ml. of ether was stirred at room temperature for 3 hours. The zinc was filtered off and the filter cake washed with ether. The filtrate was washed with NaHCO$_3$ solution and water, dried, and evaporated and the crystalline residue crystallized from methanol and then from ether to afford pure sn-glycerol 1,2-distearate, m.p. 73.5°–74.5°; $[\alpha]^{25}_D - 2.6°$ (c 1, CHCl$_3$).

Anal. Calc'd for C$_{39}$H$_{76}$O$_5$: C, 74.94; H, 12.26.
Found: C, 75.14; H, 12.19.

Following the same procedure used in the preparation of the above glycerol distearate, there was prepared the dioleate, an oil, which was chromatographed over Florisil impregnated with 10 percent boric acid, using hexane-ether mixtures to remove small amounts of the 1,3-isomer, $[\alpha]^{25}_D - 1.87°$ (c 6.2, CHCl$_3$). The 1,2-dilinoleate, 1,2-dielaidate, and other 1,2-diacylglycerols are prepared in a similar fashion.

EXAMPLE 6 sn-Glycerol 2,3-distearate 1-triphenylmethyl ether

A solution of 1.2 g. (3.59 mmol) of sn-glycerol 1-triphenylmethyl ether (prepared by NaOH hydrolysis of sn-glycerol 2,3-carbonate 1-triphenylmethyl ether as described in J. Chem. Soc. 1967, 431), 2 ml. of pyridine and 10 ml. of CHCl$_3$ was cooled in ice and a solution of 2.17 g. (7.19 mmole) of stearoyl chloride in 10 ml. of CHCl$_3$ was added dropwise. The solution was stirred for 48 hours at 25°, diluted with ether and washed with cold 0.5 N HCl, water, 5 percent NaHCO$_3$ and water. After workup there was isolated 4.2 g. of crude product which was chromatographed over 160 g. of Woelm alumina (Act. III) with petroleum ether as eluent. Crystallization from petroleum ether-methanol gave 2.25 g. (73 percent) of pure sn-glycerol 2,3-distearate 1-triphenylmethyl ether, m.p. 51.5°–52.5°. The analytical sample from petroleum ether had m.p. 52.5°–53.5°; $[\alpha]^{25}_D - 12.2°$ (c 0.99, CHCl$_3$).

Anal. Calc'd for C$_{58}$H$_{90}$O$_5$: C, 80.32; H, 10.46.
Found: C, 80.60; H, 10.55.

EXAMPLE 7 sn-Glycerol 2,3-dioleate 1-triphenylmethyl ether

To 3.34 g. (0.01 mole) of sn-glycerol 1-triphenylmethyl ether in 5.6 ml. of pyridine and 15 ml. of CHCl$_3$ was added dropwise with cooling 6.01 g. (0.02 mole) of oleoyl chloride in 25 ml. of CHCl$_3$. The reaction was stirred for 48 hours at room temperature and worked up as described for the distearate above to give an orange oil which contained 1 major product (tlc). Chromatography over 350 g. of Florisil using petroleum ether-benzene mixtures afforded 5.7 g. of the title compound, $[\alpha]^{25}_D - 9.4°$ (c 1.23, CHCl$_3$).

Anal. Calc'd for C$_{58}$H$_{86}$O$_5$: C, 80.69; H, 10.04.
Found: C, 80.56; H, 9.97.

EXAMPLE 8 sn-Glycerol 2,3-distearate

A mixture of 300 mg. of sn-glycerol 2,3-distearate 1-triphenylmethyl ether, 300 mg. of boric acid and 6 ml. of trimethyl borate was refluxed for 3 hours, then heated on a rotary evaporator for 30 minutes at 80°. The orange syrup was partitioned between ethyl acetate and water, and the organic layer was washed with water and then dried and concentrated to an oily solid. Tlc showed the crude product to be a mixture of mostly 1,2-diglyceride with a trace of 1,3-diglyceride, some triphenylmethylcarbinol and triphenylmethyl methyl ether. A crystallization from methanol removed the triphenylmethyl derivatives and another crystallization from hexane gave pure sn-glycerol 2,3-distearate, m.p. 72°–73.5°; $[\alpha]^{25}_D + 2.5°$ (c 1.2 CHCl$_3$). The 2,3-dioleate was obtained using the same procedure described for the distearate except that the crude produce (an oil) was chromatographed over Florisil impregnated with 10 percent boric acid, and using hexane and hexane-ether mixtures as the eluting system. The triphenylmethyl impurities were removed in the first few cuts, and the small amount of 1,3-diglyceride was eluted before the pure dioleate was obtained; $[\alpha]^{25}_D + 2.14°$ (c 5.62, CHCl$_3$).

The 2,3-dilinoleate, 2,3-dielaidate, and other 2,3-diacylates are prepared in a similar manner.

EXAMPLE 9 sn-Glyercol 1,2-carbonate 3-triphenylmethyl ether

To a cooled solution of 4.0 g of sn-glycerol 1,2-carbonate 3-(2,2,2-trichloroethyl) carbonate in 15 ml. of acetic acid and 15 ml. of ether was added 4.0 g. of activated zinc dust and the suspension was stirred at room temperature for 3 hours. The inorganic materials were filtered off with the aid of ether and the filtrate was evaporated at water aspirator vacuum, and then with a vacuum pump (0.02 mm, pot temperature less than 40°). The crude syrupy sn-glycerol 1,2-carbonate was dissolved in 20 ml. of dry CHCl$_3$ and 10 ml. of pyridine, and 3.8 g. of trityl chloride was added. After stirring overnight at 25° the solution was diluted with ethyl acetate and worked up in the manner described in Example 2 to give 2.0 g. (53 percent) of sn-glycerol 1,2-carbonate 3-triphenylmethyl ether, m.p. 217°–219°; [α]$_D^{25}$ −17.5° (c 3.97, CHCl$_3$).
Anal. Calc'd for C$_{23}$H$_{20}$O$_4$: C, 76.65; H, 5.59.
Found: C, 76.53; H, 5.60.

EXAMPLE 10 sn-Glycerol 1,2-distearate sn-Glycerol 1,2-carbonate 3-triphenylmethyl ether is hydrolyzed with NaOH to sn-glycerol 3-triphenylmethyl ether by the procedure of J. Chem. Soc. 1967, 431. This compound is then treated with 2 equivalents of stearoyl chloride in pyridine and chloroform according to the procedure of Example 6 to give sn-glycerol 1,2-distearate 3-triphenylmethyl ether. The triphenylmethyl group is then removed with boric acid and trimethyl borate according to the procedure of Example 8 to give sn-glycerol 1,2-distearate.

sn-Glycerol 1,2-dioleate, sn-glycerol 1,2-dilinoleate, sn-glycerol 1,2-dielaidate, and other sn-glycerol 1,2-diacylates are prepared in the same manner by acylating sn-glycerol 3-triphenylmethyl ether with 2 equivalents of oleoyl chloride, linoleoyl chloride, elaidoyl chloride, or other acyl chlorides, respectively, and then removing the triphenylmethyl group.

EXAMPLE 11 sn-Glycerol-2,3-carbonate

A solution of 12.68 g (0.0475 mole) of sn-glycerol-3-(2,2,2-trichloroethyl) carbonate in 15 ml of dry pyridine was stirred at 60° for 18 hours. The solvent and trichloroethanol were evaporated at 55° (0.02 mm), ethyl acetate was added, and the solution was washed with small volumes of dil. HCl, water, NaHCO$_3$ and brine. The ethyl acetate was dried and concentrated to the syrupy sn-glycerol 2,3-carbonate. This material can be purified via the triphenylmethyl derivative (see Example 2) or by distillation: b.p. 150° (0.15mm); [α]$_D^{20}$ + 27.84° (in substance).
Anal. Calc'd for C$_4$H$_6$O$_4$: C, 40.68; H, 5.12.
Found: C, 40.44; H, 5.15.

sn-Glycerol-2,3-carbonate can also be prepared from sn-glycerol-3-(2,2,2-trichloroethyl) carbonate by vacuum distillation of the diol.

We claim:

1. A compound of the formula

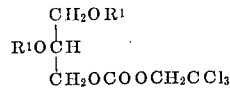

wherein each R$^1$ is a saturated or unsaturated aliphatic carboxylic acyl group of 10 to 20 carbon atoms.

2. A compound as claimed in claim 1, in which each R$^1$ is stearoyl.

3. A compound as claimed in claim 1, in which each R$^1$ is oleoyl.

4. A compound as claimed in claim 1, in which each R$^1$ is linoleoyl.

* * * * *